Jan. 5, 1926. 1,568,448
W. A. FREEMAN
INSECTICIDE APPLYING MACHINE
Filed June 20, 1923 2 Sheets-Sheet 2
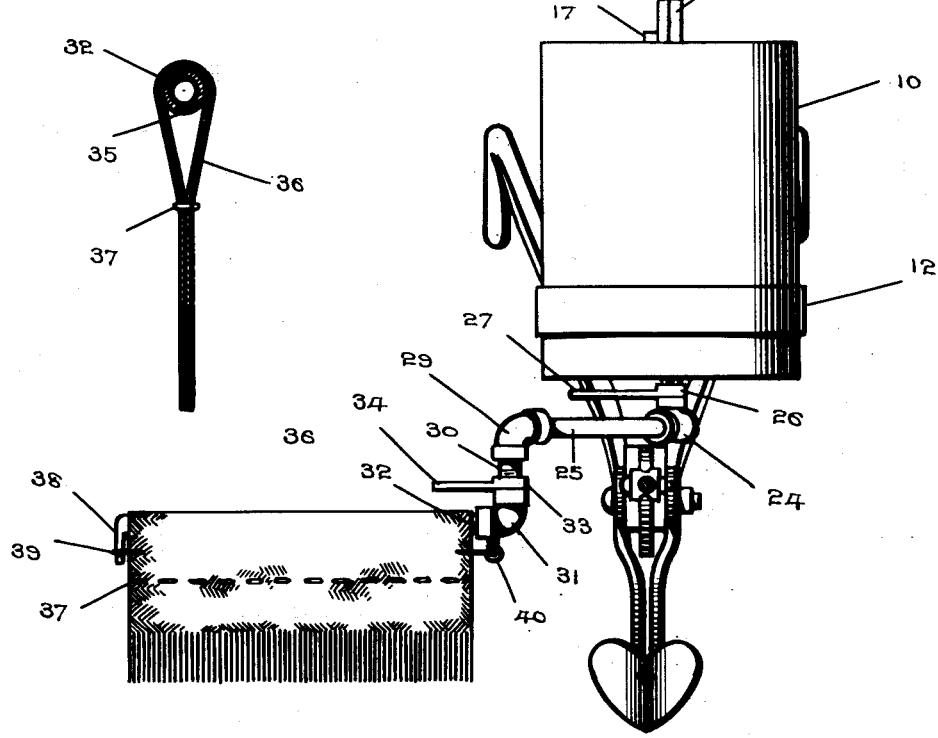
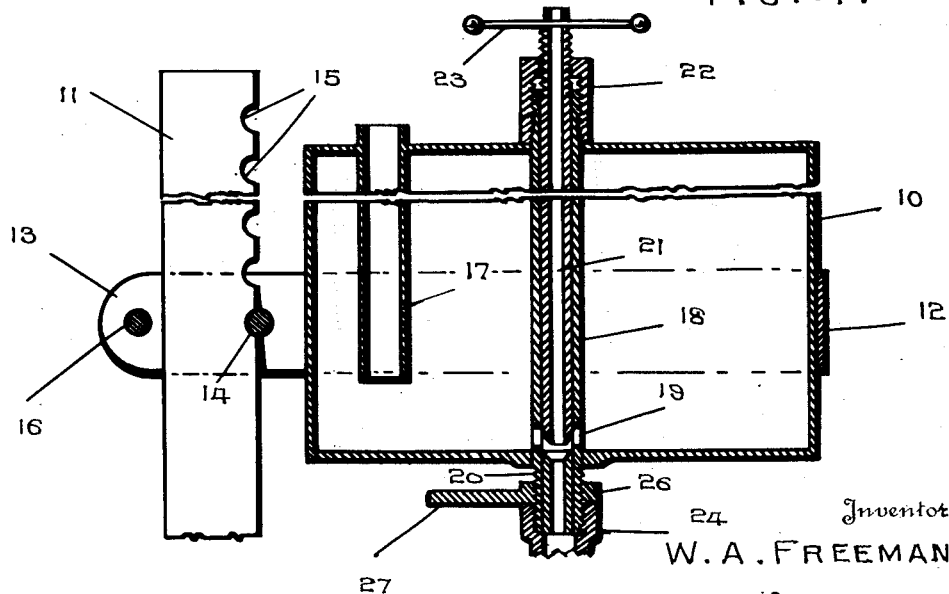
Inventor:
W. A. FREEMAN,
By W. T. Fitz Gerald & Co.
Attorney.

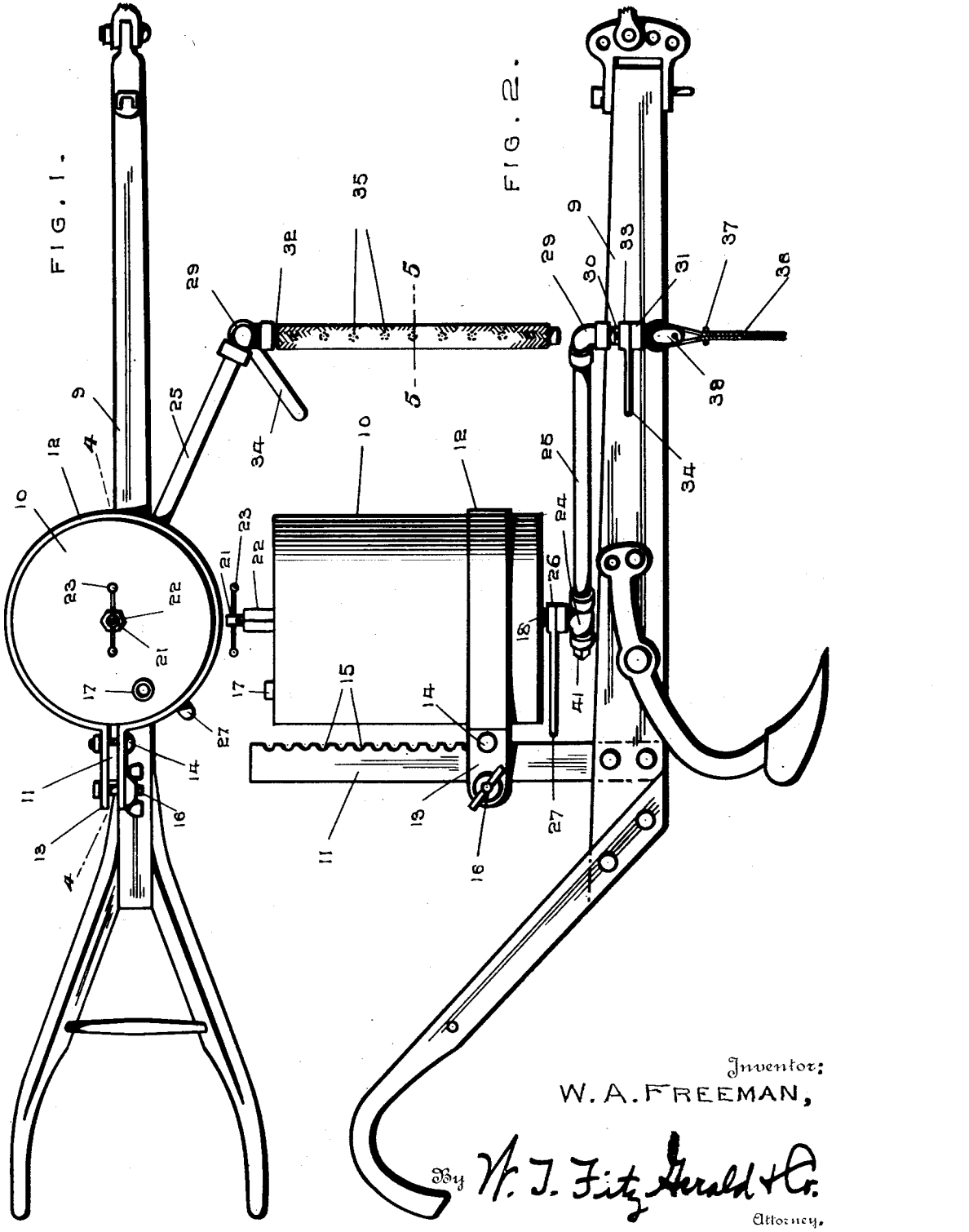

Patented Jan. 5, 1926.

1,568,448

UNITED STATES PATENT OFFICE.

WILLIAM A. FREEMAN, OF SYCAMORE, GEORGIA.

INSECTICIDE-APPLYING MACHINE.

Application filed June 20, 1923. Serial No. 646,648.

*To all whom it may concern:*

Be it known that I, WILLIAM A. FREEMAN, a citizen of the United States, residing at Sycamore, in the county of Turner and State of Georgia, have invented certain new and useful Improvements in Insecticide-Applying Machines; and I do hereby declare the following to be a full, clear, and exact description of the invention, such as will enable others skilled in the art to which it appertains to make and use the same.

The present invention relates to machines for applying liquid insecticide to cotton and other growing plants for the purpose of exterminating boll weevil and other insects, and the invention aims to provide a machine of that kind having novel and improved features of construction to enhance the utility and efficiency thereof.

Another object is the provision of novel adjustable means for applying the solution to the plants.

A further object is the provision of novel means for adjustably supporting the tank in which the solution is carried.

A still further object is the provision of novel means for controlling the discharge of the solution from the tank.

It is also an object of the invention to provide such a contrivance which can be conveniently applied to a plow beam, or the like, and which is comparatively simple in construction and manufacture, as well as being practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the device as applied on a plow beam.

Fig. 2 is a side elevation thereof.

Fig. 3 is a front view.

Fig. 4 is an enlarged vertical section on the line 4—4 of Fig. 1, portions being broken away.

Fig. 5 is an enlarged cross section on the line 5—5 of Fig. 1.

As illustrated, the device is intended for attachment to the beam 9 of a plow or cultivator used for middle bursting or cultivation between the rows of plants, and the device includes a tank 10 of suitable size for holding the insecticide solution or liquid. Said tank is supported above the beam by a post or standard 11 having its lower end bolted or otherwise secured to the beam, and the tank is adjustably supported from said post to be disposed in different vertical positions, according to the heights of the plants. A band 12 embraces the tank, and is split, and has the rearwardly extending terminals 13 through which a clamping bolt 14 engages, for clamping the band tightly around the tank. The terminals 13 extend across the opposite sides of the post 11, and the forward edge of said post has a vertical series of notches 15 for the engagement of the post 14. Another clamping bolt 16 engages through the terminals 13 of the band in rear of the post 11 for clamping the terminals 13 against the post 11, whereby the band is supported in its adjusted position. The bolt 14 engaging in one of the notches 15 will assist in supporting the band and will prevent the clamp portion of the band from slipping down on the post. When the bolt 16 is loosened, the band can be shifted forwardly slightly, to remove the bolt 14 from the notch, thereby permitting the band and tank to be slid upwardly or downwardly for vertical adjustment. When the tank has been adjusted to the desired vertical position, it is shifted rearwardly to move the bolt 14 into the corresponding notch, and the bolt 16 is then tightened to maintain the adjustment. The terminals 13 being sprung toward one another in rear of the post 11 will prevent the bolt 14 from moving forwardly out of the corresponding notch 15.

A filling tube 17 extends through and is carried by the top of the tank, and depends in the tank, for convenience in filling the tank, and said tube will prevent the liquid from splashing out through the filling opening when the tank is full without having to use a stopper or cap for said opening.

A discharge tube 18 for the liquid is disposed centrally of the tank in a vertical position and extends through the top and bottom of the tank. Said tube has the outlet apertures 19 therein spaced slightly above the bottom of the tank, to prevent sediment in the tank from clogging said apertures. A valve seat 20 is secured within the tube 18 below the apertures 19, and a tubular valve 21 is fitted in the tube 18 above said apertures and is projectable downwardly across the apertures 19 toward the seat 20 for shutting off the flow of liquid from the tank, and to regulate the discharge of the liquid. The upper terminal of the valve 21 is screw-threaded through a gland nut 22 screw-threaded on the upper protruding terminal of the tube against the top of the tank, and said gland nut can contain packing to prevent leakage. A suitable handle 23 is carried by the upper terminal of the valve 21 for rotating the valve to screw same downwardly and upwardly. The valve being tubular will permit air to flow downwardly through the valve in order that the liquid can flow from the lower end of the valve out through the lower terminal of the tube 18.

Adjustable discharge means is provided for applying the solution or liquid to the plants. Thus, a T-coupling or fitting 24 is screw-threaded on the lower terminal of the tube 18 with its branches or arms extending in opposite directions, and a pipe 25 is secured in one arm or branch of said T-coupling and extends to one side of the beam 9, and said pipe 25 can be turned to different angular positions by screwing the coupling 24 on the tube 18. A lock nut 26 is threaded on the tube 18 to bind against the coupling 24, to maintain the adjustment, and said nut has a handle 27 projecting therefrom for convenience in loosening and tightening the nut. The pipe 25 can be turned about the vertical axis of the tube 18, and said pipe has an elbow 29 secured to the free end thereof and a depending nipple 30 is secured in said elbow. An elbow 31 is screw-threaded on the nipple 30 and has secured therein a discharge pipe 32. Both pipes 25 and 32 are disposed horizontally, and the discharge pipe 32 can be turned to different angular positions about the vertical axis of the nipple 30 by screwing the elbow 31 on said nipple. A lock nut 33 is threaded on the nipple 30 to bind against the elbow 31 for maintaining the adjustment of the pipe 32 relatively to the pipe 25, and said nut 33 has a handle 34. The discharge pipe 32 is provided along the bottom thereof with the spaced discharge apertures 35.

The solution is preferably mopped on the plants, and for this purpose there is used a mop 36 of suitable fabric, the sheet being doubled and disposed or hung over the pipe 32. A wire 37 is threaded through the opposite portions or halves of the mop 36, to hold them together and to stiffen and weight the mop between the upper and lower portions thereof. The lower edges of the mop can be frayed to drag readily over the leaves, branches and buds of the plants. The outer or free end of the pipe 32 has a depending aperture portion 38 to which the mop 36 is attached by a wire 39, or the like, and the inner edge portion of the mop is anchored to the elbow 31, by a wire 40, or the like. The solution which drips from the apertures 35 is absorbed by the mop, and the mop in dragging over the plants will apply the solution to the plants in a thin film.

As shown, a single discharge means is provided at one side of the beam 9, the opposite end of the coupling 24 being closed by a plug 41 (see Fig. 2), but a second discharge means can be provided at the opposite side of the beam by removing the plug 41 and attaching the second pipe 25, so that similar discharging means are provided at opposite sides with the pipes 25 projecting in opposite directions.

The rate of discharge of the liquid from the tank is regulated by the valve 21, and the mop 36 will drag over the plants during the plowing or cultivating operation, so that the insecticide is applied to the plants without separate time and labor. In some cases, it may be preferred to spray the solution on the plants. In this event, the mop 36 is removed, so that the liquid is sprayed from the apertures 35 directly on the plants.

The device is adjustable for plants of different type and for rows of plants spaced apart different distances. Vertical adjustment of the spraying means is obtained by adjusting the tank 10 vertically on the post 11, as hereinbefore indicated, so that the pipe 32 is raised or lowered to the desired position above the ground to pass over the plants. By loosening the nuts 26 and 33, the pipes 25 and 32 can be turned about vertical axes. When the pipe 25 is turned, the pipe 32 is moved toward or away from the plow beam 9, to position the pipe 32 above and across the row of plants, and the pipe 32 can be swung relatively to the pipe 25 to bring said pipe 32 to a transverse or angular position, such as may be desired or preferable. The nuts 26 and 33 are tightened after the pipes 25 and 32 are adjusted, to maintain the adjustments, even though the pipes may brush against the plants, tending to turn the pipes out of their adjusted position.

The device is conveniently attached to the plow beam or other support as a unit, by simply fastening the post 11 to the plow beam or support. Although a special carrier can be provided for the device, the device may be conveniently carried by the plow or cultivator, in order that the insecticide solution can be applied to the plants of a row while middle bursting or cultivating between the rows.

Having thus described the invention, what is claimed as new is:—

1. A device of the character described comprising a liquid tank, discharge means connected to and carried by the tank, a post to be secured to a plow beam or other support, a band embracing the tank and having means for clamping the tank therein, and means carried by the clamp to adjustably engage the post for the vertical adjustment of said band and tank.

2. A device of the character described comprising a liquid tank, discharge means connected to and carried by the tank, a post to be secured to a plow beam or other support, and a band embracing the tank and having a clamp portion engaging the post for vertical adjustment.

3. A device of the character described comprising a liquid tank, discharge means connected to and supported by the tank, a post to be secured to a plow beam or other support, a band embracing the tank and having terminals to extend across opposite sides of said post, a bolt engaging through said terminals to clamp the band on the tank, and another bolt engaging through said terminals to clamp the terminals against the post.

4. A device according to claim 3 wherein the post has a series of notches for the engagement of the first named bolt.

In testimony whereof I have signed by name to this specification.

WILLIAM A. FREEMAN.